United States Patent [19]

Crouse et al.

[11] Patent Number: 4,831,517

[45] Date of Patent: May 16, 1989

[54] BRANCH AND RETURN ON ADDRESS INSTRUCTION AND METHODS AND APPARATUS FOR IMPLEMENTING SAME IN A DIGITAL DATA PROCESSING SYSTEM

[75] Inventors: Richard S. Crouse; Randall P. Boudreaux, both of Boca Raton; John J. Cazzolla, Jr., Coral Springs, all of Fla.

[73] Assignee: International Business Machines Corporation, Armonk, N.Y.

[21] Appl. No.: 917,580

[22] Filed: Oct. 10, 1986

[51] Int. Cl.⁴ .................................................. G06F 9/22
[52] U.S. Cl. ...................................... 364/200; 371/10
[58] Field of Search ...................... 371/7, 10; 364/200

[56] References Cited

U.S. PATENT DOCUMENTS

| | | | |
|---|---|---|---|
| 3,956,735 | 5/1976 | Cassonnet | 364/200 |
| 4,019,175 | 4/1977 | Nakao et al. | 364/900 |
| 4,153,933 | 5/1979 | Blume, Jr. et al. | 364/200 |
| 4,408,274 | 10/1983 | Wheatley et al. | 364/200 |
| 4,607,332 | 8/1986 | Goldberg | 364/300 |

*Primary Examiner*—David L. Clark
*Attorney, Agent, or Firm*—Richard E. Bee

[57] ABSTRACT

A method of operating a digital data processor includes the supplying to the digital data processor of a branch and return on address (BAROA) instruction having an operation code field, a memory entry address field and a memory exit address field. This method also includes for such branch and return on address instruction the steps of loading the operation code field into an instruction register, loading the memory exit address field into an address register and loading the memory entry address field into a program counter. This method further includes storing the next sequential address following the address of the current BAROA instruction into a register stack, and then fetching from memory and executing a sequence of instructions starting with the instruction residing at the memory entry address provided by the branch and return on address instruction. The program counter is incremented each time an instruction is executed. In this manner, the program counter provides the memory addresses of the instructions to be fetched. This method further includes the steps of comparing the memory address in the program counter with the exit address in the address register and loading a return instruction operation code into the instruction register when the memory address in the program counter becomes equal to the exit address in the address register, such return instruction operation code, in turn, causing the address stored in the register stack to be loaded into the program counter.

6 Claims, 5 Drawing Sheets

BRANCH AND RETURN ON ADDRESS INSTRUCTION AND METHODS AND APPARATUS FOR IMPLEMENTING SAME IN A DIGITAL DATA PROCESSING SYSTEM

DESCRIPTION

TECHNICAL FIELD

This invention relates to branch type computer instructions and to methods and apparatus for implementing such instructions in a digital data processing system. This invention is particularly useful in microprocessor based systems wherein some or most of the program code for controlling the microprocessor is contained in a read only memory unit.

BACKGROUND ART

In microprocessor based input/output (I/O) controllers, for example, the typical controller architecture includes a microprocessor, a read only memory (ROM) for microprocessor instruction code storage, a read-write memory (RWM) for microprocessor work space and some amount of reserved read-write memory space for additional instruction code to be used, if needed, to "patch" (correct) ROM code "bugs" (defects) discovered after the product has been shipped to customers. The present invention is particularly useful for minimizing some of the problems associated with patching ROM code using RWM-loaded code and presents a unique solution that greatly enhances the power to do so.

The necessity for providing ROM patch capability in computer systems comes from the need to avoid the considerable financial impact of updating systems in the field by replacing the original ROM modules with new ROM modules containing corrected code. This situation arises when ROM code bugs are discovered after a goodly number of systems have been shipped to customers.

A commonly practiced method for protecting the product against this undesired event is to distribute "patch hooks" throughout key areas in the ROM code. A "patch hook" is a branch instruction which causes the processor to branch to the instruction patch area of the read-write memory. The microprocessor branches to the read-write memory space to see if an instruction routine has been loaded into that RWM space to patch or fix a ROM code problem. If it has, the microprocessor executes the RWM code and then returns back to the ROM code, usually bypassing the faulty ROM instructions. If a patch has not been loaded into the read-write memory for that patch hook, then the microprocessor simply branches back to the next sequential instruction position after its original ROM Branch instruction position and continues normal execution of ROM instructions.

This technique allows a "patch" to be written to resolve a problem in the ROM code. This patch is then distributed on a diskette to the customers who can then down load it via the appropriate software utility to the patch space in the I/O controller read-write memory. This is a much less expensive corrective method than having to manufacture and install new read only memory modules.

A major problem with this method is that it may be necessary to duplicate large amounts of ROM code in the RWM space in order to change specific lines of code, and this in turn reduces the capability for further patching. Duplicating good ROM code is usually required since finding a patch hook near the faulty ROM code is a matter of chance. For example, the nearest patch hook to a ROM bug may be located 500 instructions prior to the bug. In this case, it would be necessary to duplicate all 500 good instructions in the RWM patch, change the faulty ROM instructions and then branch back to the ROM code just beyond the bad code. Such a patch would probably exhaust the majority of the entire reserved RWM patch area and would greatly reduce the capability for providing additional patches.

SUMMARY OF THE INVENTION

This invention provides a new processor instruction that virtually eliminates the need for duplicating the good ROM code when using an RWM patch to correct a defective segment of ROM code. This greatly increases the power of the patch hook method for correcting defects in ROM code.

For sake of a name, this new instruction is herein called a "Branch And Return On Address" (BAROA) instruction. This new instruction includes an operation code (op code) field, an entry address field and an exit address field. When a ROM code correction is desired, this BAROA instruction is loaded into the read-write memory at the memory address to which the ROM patch hook will branch. Executing this BAROA instruction causes the processor to branch back to the ROM entry address specified by the BAROA instruction and to continue normal execution of the ROM instructions until the ROM address specified by the BAROA exit address field is reached. At this point, the processor branches back to the next consecutive read-write memory address immediately following the BAROA instruction. The processor then executes the corrective code which is located in the read-write memory immediately following the BAROA instruction. After the corrective code is executed, the processor branches back to and resumes execution of the ROM code, starting with the ROM instruction immediately following the ROM code segment which was replaced by the corrective code.

The use of this BAROA instruction eliminates the need for duplicating any good ROM code which may reside between the patch hook location and the defective code location in the read only memory. In the previously described example, where the nearest patch hook to the defective ROM code was 500 instructions earlier, the first instruction of the patch routine in the read-write memory is a BAROA instruction which causes the processor to branch back and execute from the read only memory all 500 lines of ROM code separating the patch hook from the defective code segment. The next several instructions of the RWM patch would be the actual defect correcting code. The final instruction in the RWM patch is a branch back to the ROM code at a point just beyond the defective ROM code.

For this example, the amount of RWM patch space required to correct the ROM code defect has been reduced by 500 lines of code. Since only a few lines are normally required for the defect correcting code, this represents a very substantial savings in read-write memory space.

Using the BAROA instruction, any single line of ROM code, for example, can be deleted, altered or expanded into multiple instructions by means of a few instructions in the patch space in the read-write memory. To delete a line of code, only two instructions are required in the RWM patch space, namely, a BAROA instruction and a branch instruction for returning to the next line after the deleted line. To alter or correct a line requires only three patch space instructions, namely, the BAROA instruction, the corrected instruction for the line in question and the return branch instruction. To expand the single instruction, only the BAROA and the return branch instructions are needed in addition to the instructions to be added. Thus, the use of the BAROA instruction considerably reduces the sizes of the patches in the read-write memory.

The use of the BAROA instruction also removes the burden of critically distributing patch hooks to key areas of the ROM code. Also, if used in the most efficient manner, the BAROA instruction will reduce the number of patch hooks which need to be located in the read only memory. In fact, in some cases, only a single patch hook need be placed in the read only memory.

For a better understanding of the present invention, together with other and further advantages and feature thereof, reference is made to the following description taken in connection with the accompanying drawings, the scope of the invention being pointed out in the appended claims.

BRIEF DESCRIPTION OF THE DRAWINGS

Referring to the drawings.

DESCRIPTION OF THE PREFERRED EMBODIMENTS

Different names are sometimes used to refer to branch type instructions. Sometimes they are called "branch" instructions, sometimes they are called "jump" instructions and sometimes they are called "call" instructions. Other names may also be used. In each case, such an instruction may cause a processor to depart from its normal sequential execution of instructions and go to and commence executing an out of sequence set of instructions. For conditional type branch instructions, the branch may not always be taken. Unless otherwise specified, the use of the term "branch" herein and in the appended claims is intended to be generic in nature and is intended to include any and all manner of branch type instructions.

Figures 1, 2:
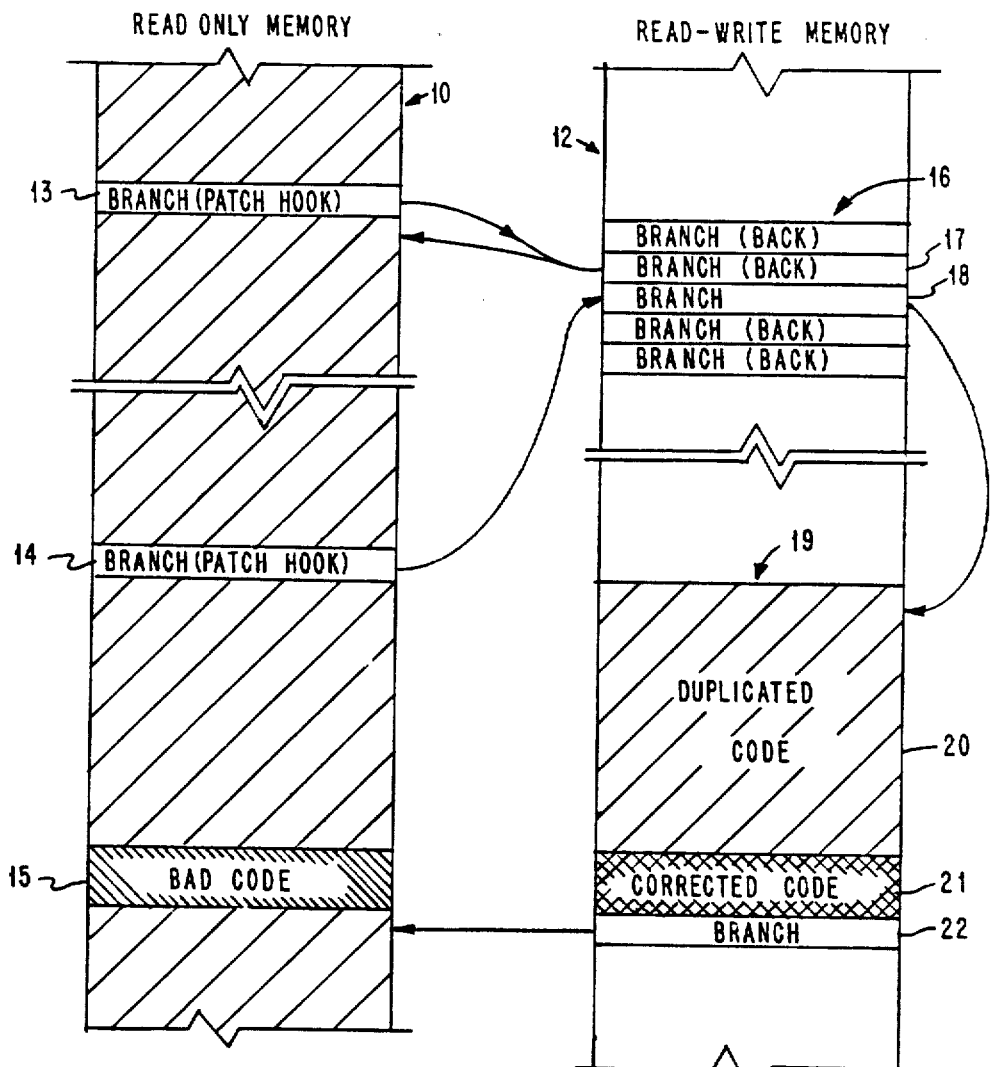
FIG. 1 shows the known method of using patches in read-write memory to correct defects in read only memory code.
FIG. 2 shows a preferred format for the new branch and return on address (BAROA) instruction.

Referring to FIG. 1, there is shown the known patch hook method of using patches in a read-write memory to correct errors and defects in the code in a read only memory. A portion of a random access read only memory (ROM) is indicated at 10 and a portion of a random access ready-write memory (RWM) is represented at 12. Each memory is composed of horizontal lines of code with each line having a different memory address. For present purposes, it is assumed that what is stored on the different lines in each memory are computer instructions for telling the associated processor or microprocessor what to do. During normal operation, the processor executes these instructions one after the other in a sequential manner. In the illustrated examples given herein, it is assumed that the direction of execution is from the top toward the bottom of the memory portions shown in the drawings. In other words, the processor advances down the page as it moves from one instruction to the next.

As is known, a read only memory is a memory unit or a memory element which can only be read by the processor. The processor cannot write to or store information into such a memory. The information stored in a read only memory is permanently imbedded therein at its time of manufacture. For the case of a read-write memory, on the other hand, the processor can store or write new information into it, in addition to being able to read out from it any information previously written or stored therein.

Some authors refer to a random access read-write memory as a "RAM" (random access memory). This terminology is not used herein because, strictly speaking, "random access" refers only to the manner of addressing the memory and not to the reading and the writing capability of the memory. The terminology "read-write memory" or "RWM" will instead be used herein.

The problem with correcting programming problems (bugs) in the code stored in a read only memory is that there is no way of changing, modifying or erasing what has already been stored into the read only memory. What is in there is permanently imbedded and cannot be changed. The only way of making a change is to modify the semiconductor fabricating masks and to manufacture new read only memory chips using the modified masks. It is then necessary to remove the old chips from the computers which use them and to replace them with the new modified read only memory chips. All of this tends to become rather time consumming and expensive.

The patch hook method provides a more flexible, more economical and quicker to implement solution to the problem. The patch hook method is based on two underlying premises. The first premise is that no matter how carefully the program code is written and no matter how thoroughly it is tested, there is a high degree of probability that it will nevertheless contain some bugs or some deficiencies which will be discovered at a later date. Therefore, when the program code is to be imbedded in a read only memory chip, it is best to plan ahead and provide some means for taking this into account. The second premise is that most microprocessor based systems which use read only memories also use read-write memory chips for providing temporary work space and the like for the microprocessor. In this case, part of the read-write memory space can be reserved for use in holding code patches and code fixes for the read only memory code. These underlying premises are assumed to exist for the embodiments of the invention described herein.

FIG. 1 shows the known patch hook method. The read only memory (ROM) 10 and the read-write memory (RWM) 12 are assumed to take the form of semiconductor integrated circuit memory chips and are assumed to be coupled to a microprocessor in a microprocessor based system. The ROM chip 10 contains the control program for the microprocessor and, as such, contains the instructions for causing the microprocessor to perform its normal system operating functions. In order to take care of later discovered programming bugs, defects and omissions, a plurality of "patch hook" instructions are included in the ROM code at points therein which appear to be strategically significant. Two such patch hooks are indicated at 13 and 14. These patch hooks 13 and 14 take the form of branch instructions. They are unconditional branch type instructions which cause a branching to a specified out of sequence memory location which, in the present case, is a memory location in the read-write memory 12. These branch instructions are used with coordinating branch instructions in the RWM so that the processor branches from the ROM code to the RWM patch area and then branches back to the ROM code when no patch code has been loaded for that patch hook. A segment of defective ROM code is indicated at 15 in FIG. 1. The remainder of the ROM memory space shown in FIG. 1 is assumed to contain good and valid ROM code.

Each patch hook instruction in ROM 10 causes an unconditional branch to its own patch hook responsive branch (back) instruction location in a patch hook branch table area 16 in the RWM 12. The branch (back) instruction is an unconditional branch back to the next sequential line of ROM code following the original patch hook branch instruction. The patch hook response instructions for patch hooks 13 and 14 are indicated at 17 and 18, respectively.

During normal operation, the microprocessor commences to execute the ROM instructions one at a time in a sequential manner starting at the top of the ROM memory portion shown in FIG. 1. When the patch hook instruction 13 is reached, the microprocessor unconditionally branches to the patch hook responsive location 17 in the read-write memory 12. The presence of a branch (back) instruction in this RWM location 17 indicates that there is no corrective code for the patch hook 13. In this case, the microprocessor immediately branches back to the next instruction following the patch hook instruction 13 in ROM 10.

After returning to ROM 10, the microprocessor resumes the execution of the ROM instructions in a one at a time sequential manner. This continues until the next patch hook instruction 14 is reached. The microprocessor then unconditionally branches to the branch hook branch table area 16 in the read-write memory 12. In particular, it branches to the patch hook responsive instruction 18. In this case, there is a further branch instruction residing at the instruction location 18. This branch instruction 18 causes the microprocessor to branch to a patch code segment 19 located in a patch storage area of RWM 12. This patch code segment 19 for the patch hook 14 includes a duplicate copy 20 of the good ROM code following the patch hook 14, a corrected code segment 21 which is to replace the bad code 15 and a branch instruction 22 for branching back to the next instruction immediately following the bad code 15 in ROM 10. The microprocessor executes the instructions in this patch code segment 19 one at a time in a sequential manner. When the branch instruction 22 is reached, the microprocessor branches back to ROM 10 and resumes execution of the instructions in ROM 10. In this manner, the bad code 15 is bypassed by means of the patch code segment 19.

Unfortunately, in order to do this, it is necessary to include in the read-write memory 12 a duplicate copy 20 of the good ROM instructions located between the patch hook 14 and the bad code 15. Since this duplicated code 20 may contain as many as 500 or more instructions, a considerable amount of read-write memory space may be required for the patch code segment 19. This can become a troublesome problem where several different patches are required and each is required to duplicate a relatively large number of good ROM instructions. In particular, there may not be enough space in the read-write memory to hold all of the desired patches.

A primary purpose of the present invention is to provide a new processor instruction for enabling patch code segments to be provided which do not require the duplication in RWM of any good and valid ROM instructions. The preferred format for this new instruction is shown in FIG. 2. For sake of a name this new instruction is herein called a "branch and return on address" instruction. This will sometimes be referred to by the acronym of "BAROA". As indicated in FIG. 2, this new instruction includes an operation code (op code) field, an entry address field and an exit address field. In the patch cod application described herein, these entry and exit addresses are ROM entry and ROM exit addresses.

Figure 3:
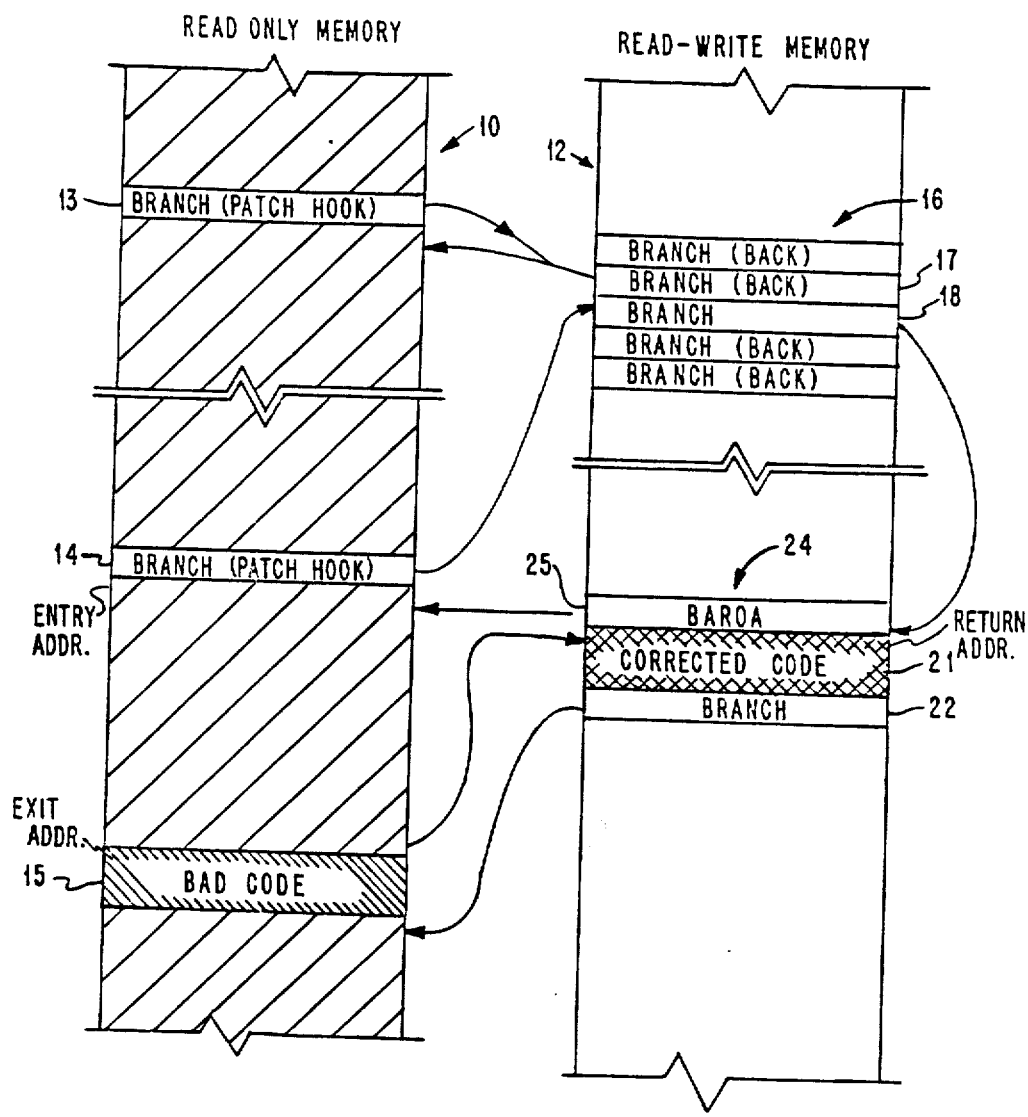
FIG. 3 shows one way of using the new BAROA instruction to correct a code defect in a read only memory.

FIG. 3 shows the use of this new BAROA instruction for the example of FIG. 1. In FIG. 3, the patch code segment in the read-write memory 12 is indicated at 24. As can be seen, a "branch and return on address" instruction 25 has replaced the duplicated ROM code 20 of FIG. 1. This BAROA instruction 25 causes an immediate unconditional branch back to the read only memory 10 at the ROM entry address specified in the entry address field of the BAROA instruction. The address specified in the present example is the address of the next ROM instruction following the patch hook instruction 14. The microprocessor then resumes sequential execution of the good instructions in ROM 10 until the ROM exit address specified in the exit address field of the BAROA instruction is reached. In the present embodiment, this exit address is the address of the first ROM instruction in the bad code 15. When this exit address becomes available as the address of the next instruction to be fetched, the microprocessor branches back to the read-write memory 12 to the RWM instruction immediately following the BAROA instruction. The microprocessor then commences executing the corrected code 21 contained in the read-write memory 12. When the branch instruction 22 is reached, the microprocessor branches back to the read only memory 10 and resumes execution of the ROM instructions, starting with the instruction immediately following the bad code 15.

Note that the first instruction in the bad code 15 is not executed. During execution of the last instruction in the good ROM code, a program counter is incremented to point to the first instruction of the bad code as the next instruction to be fetched. Before this fetching is completed, however, the microprocessor branches to the read-write memory 12. Thus, the first instruction of the bad code is not executed.

As is seen from the foregoing, the new BAROA instruction causes the microprocessor to use the read only memory for purposes of executing the good ROM instructions which are located between the patch hook and the bad code. Thus no duplication of these good ROM instructions is required in the read-write memory. Thus, a savings in RWM memory space is realized. In some cases, this savings may be rather considerable and may even make the difference as to whether or not all the desired ROM code patches can be provided.

Figure 4:
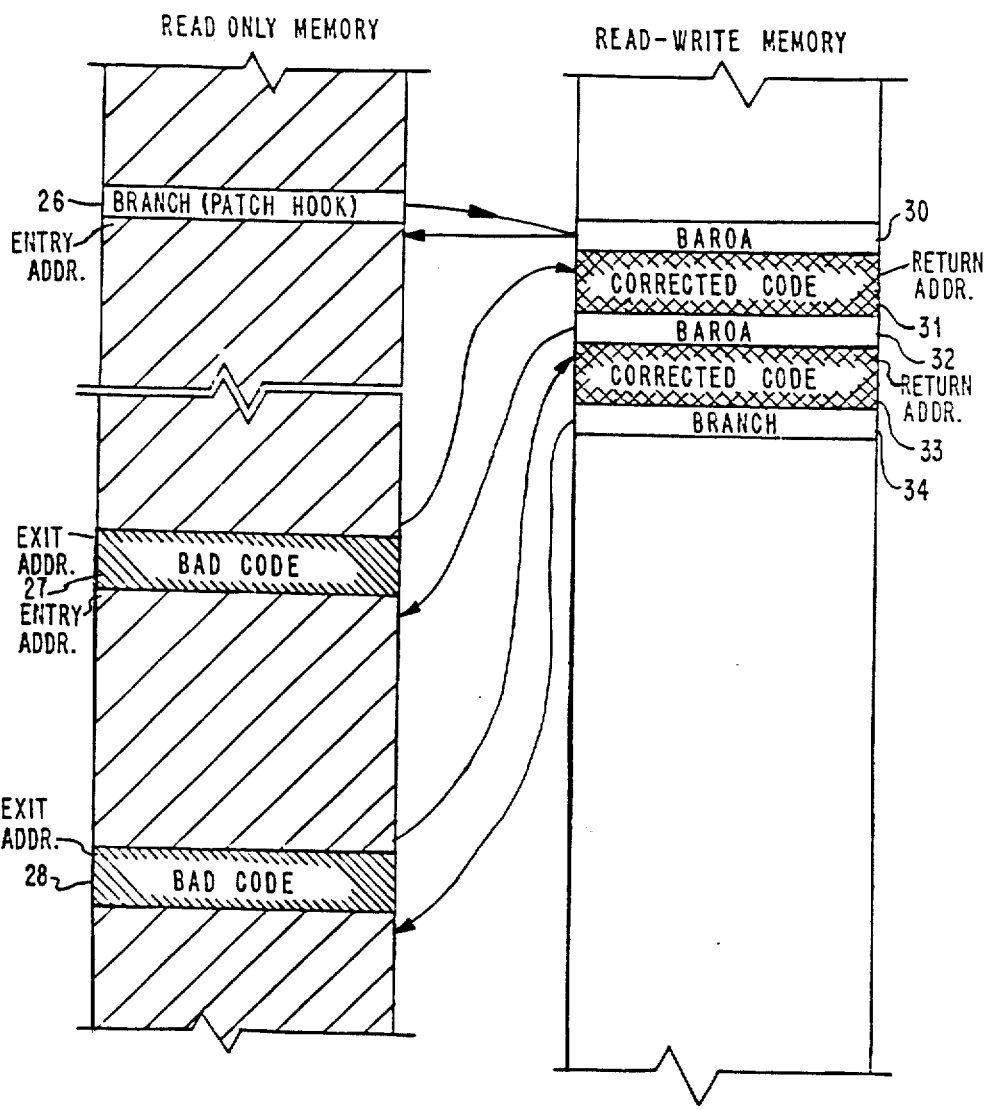
FIG. 4 shows a method of using a plurality of BAROA instructions in connection with a single patch hook located in read only memory.

FIG. 4 shows how a plurality of read-write memory patches can be coupled to a single patch hook instruction. The patch hook instruction is located at 26 and bad code segments are indicated at 27 and 28 in the read only memory. The patch hook instruction 26 causes a branch to a first BAROA instruction 30 located in the read-write memory. This BAROA instruction 30 causes a branch back to the read only memory to cause the microprocessor to execute the good ROM instructions located intermediate the patch hook 26 and the bad code 27. The microprocessor then branches back to the read-write memory to execute the corrected code 31 in place of the bad code 27.

Immediately following the corrected code 31 is a second BAROA instruction 32. This BAROA instruction 32 causes the microprocessor to branch back to the read only memory to execute the good ROM instructions residing therein intermediate the bad code 27 and the second segement of bad code 28. Immediately following execution of the good ROM instruction immediately preceeding the bad code 28, the microprocessor returns to the read-write memory to execute a second segment of corrected code 33 in place of the bad code 28. After this, the RWM branch instruction 34 causes a branch back to the read only memory and the microprocessor resumes executing the good ROM instructions following the bad code 28.

Where appropriate, this process may be repeated and additional RWM patches may be coupled to the ROM patch hook instruction 26. In some cases, this technique may be extended so that only a single patch hook instruction is required in the read only memory. In such a case, all RWM patches would be coupled to this single ROM patch hook. This would eliminate the need for distributing a goodly number of patch hooks throughout the ROM code. It would also eliminate the need for all but one of the initial patch hook responsive branch table instructions shown at 16 in FIGS. 1 and 3.

As indicated by the foregoing, the use of the branch and return on address (BAROA) instruction removes the burden of critically distributing patch hooks to key areas of the ROM code. In the ultimate case, only a single patch hook need be placed at the very beginning of the read only memory code.

Figure 5:
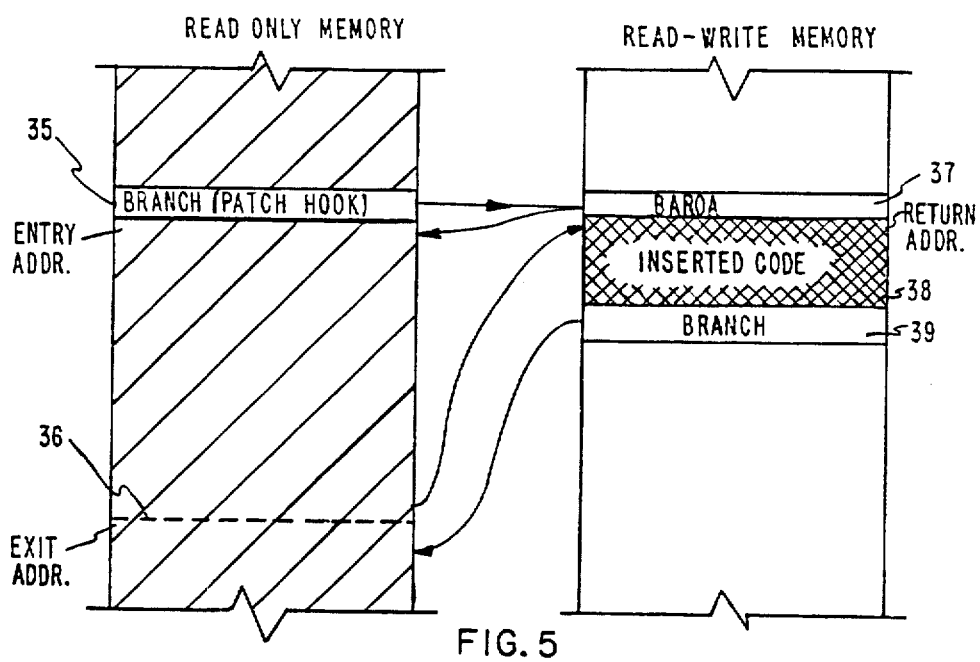
FIG. 5 shows the insertion of additional code into the execution of code located in a read only memory.

FIG. 5 shows how the BAROA instruction can be used to insert additional code into a ROM program at a point where there is no bad code to be replaced. The appropriate patch hook instruction is indicated at 35 in the read only memory and the ROM location at which the additional code is to be inserted is indicated by the dash line 36. The read-write memory includes the BAROA instruction 37, the additional code 38 to be inserted and the concluding branch instruction 39. In this case, the exit address field of the BAROA instruction contains the address of the ROM instruction immediately following the desired insertion point 36. This ROM instruction, however, is not executed at this point and the return to the read-write memory takes place immediately following execution of the ROM instruction preceeding the insertion point. The branch address contained in the concluding RWM branch instruction 39 is the address of the ROM instruction immediately following the desired insertion point 36 and this instruction os now executed when this branch is taken.

Figure 6:
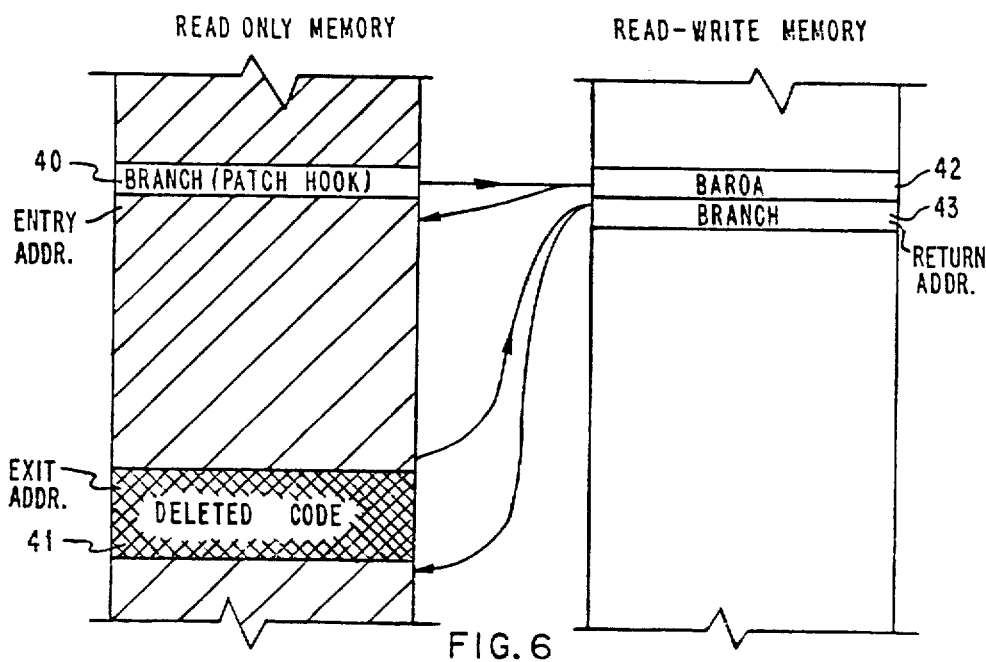
FIG. 6 shows a method of deleting a segment of the read only memory code.

FIG. 6 shows how the BAROA instruction may be used to effectively delete undesired ROM instructions for the case where there are no corrected instructions to take their place. The read only memory includes a patch hook instruction 40 and the code to be deleted is indicated at 41. The read-write memory includes a BAROA instruction 42 and and a branch instruction 43. These two instructions 42 and 43 are sufficient for executing the intermediate good code in the read only memory and for bypassing the undesired code (deleted code) indicated at 41 in the read only memory.

Figure 7:
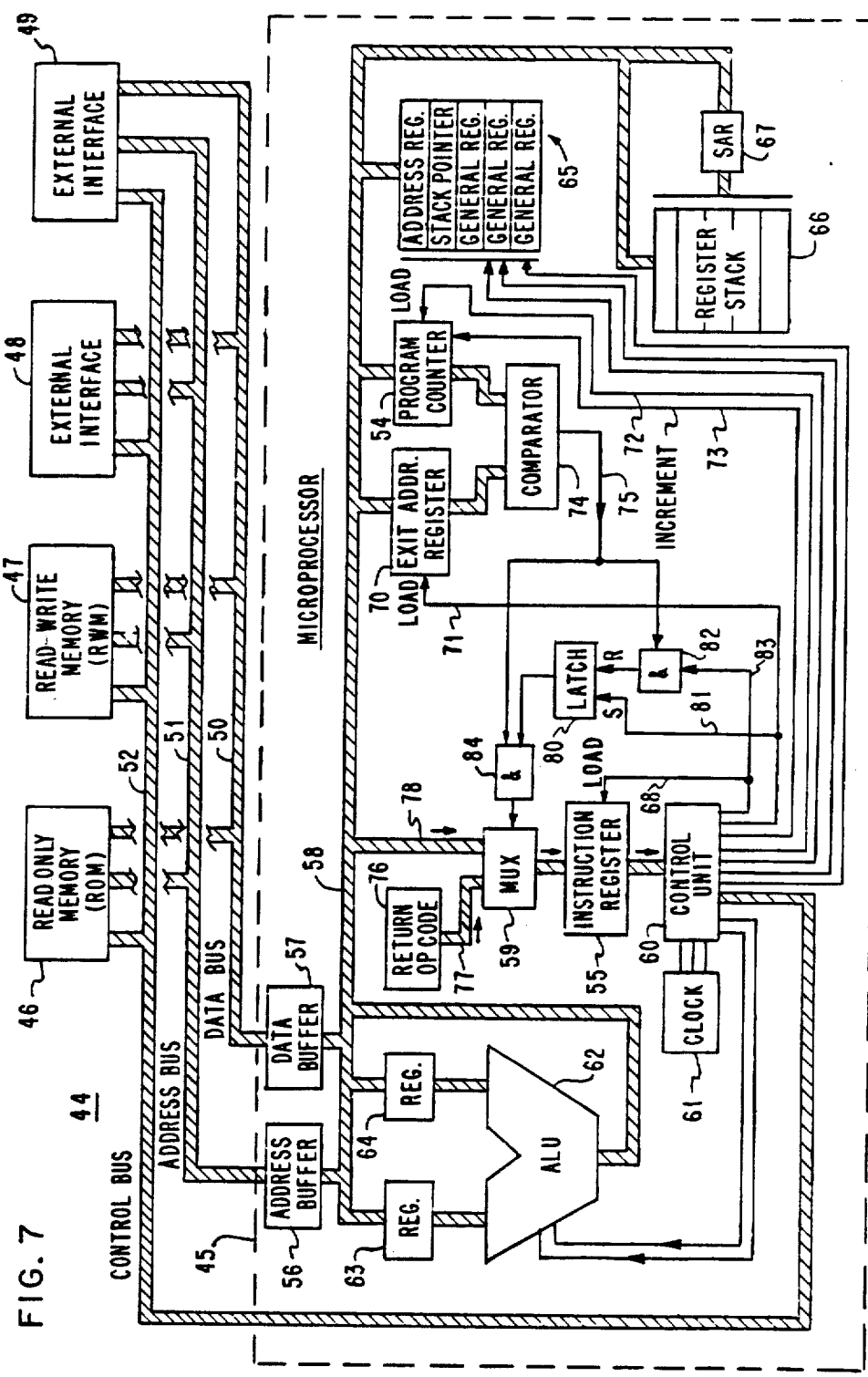
FIG. 7 shows a representative embodiment of a microprocessor based I/O controller which includes circuitry for practicing the present invention.

Referring now to FIG. 7, there s shown a representative embodiment of a digital data processing system which includes a representative form of structure for practicing the present invention. I particular, FIG. 7 shows a microprocessor based input/output (I/O) controller 44 of a type which may be used for coupling a peripheral device to a host computer. This I/O controller 44 includes a microprocessor 45, a random access read only memory (ROM) 46, a random access read-write memory (RWM) 47 and external interfaces 48 and 49. The latter four units 46–49 are connected to the I/O bus of the microprocessor 45. This microprocessor I/O bus includes a data bus 50, an address bus 51 and a control bus 52.

In use, the external interface 48 is connected to the peripheral device (not shown), while the external interface 49 is connected to the host computer I/O bus (not shown). The I/O controller 44 serves to pass information back and forth between the peripheral device and the host computer. The read only memory 46 contains the program instructions which control the operation of the I/O controller 44. The instructions stored in ROM 46 include at least one patch hook instruction for use in providing corrections to the control program contained in ROM 46. The read-write memory 47 includes work space for the microprocessor 45 and some reserved storage space for storing any patches that they may be needed for the control program in ROM 46.

When patch code is needed in the read-write memory 47, such code is installed therein by down-loading it from the host processor via the external interface 49. Typically, code patches and code fixes will be recorded onto a diskette which is distributed to the user of the data processing equipment. This diskette is inserted into the diskette unit in the host computer and the patch code is read therefrom and stored into the main storage unit in the host computer. From there, it is transferred and written into the read-write memory 47 of the I/O controller by way of the external interface 49. After storage in the RWM 47, it is ready for use by the I/O controller 44.

The digital data processor represented by microprocessor 45 includes various instruction and data processing elements. One such element is a program counter 54 for holding the memory address of the instruction to be executed. By memory address is meant the instruction address in ROM 46 or, if a patch is in progress, the memory address in RWM 47. It is assumed herein that ROM 46 and RWM 47 are assigned to two different address ranges so that there is no ambiguity as to which memory is being addressed.

The normal non-branch procedure for the microprocessor 45 is to increment the count value in program counter 54 at some point during the execution of each instruction so as to provide therein the address of the next instruction to be fetched. At the tail end of each instruction, this address in program counter 54 is used to fetch the next instruction from ROM 46 or RWM 47, as the case may be. For the case of a branch instruction, if the branch is to be taken, then the branch address is loaded into the program counter 54 before the next instruction is fetched.

The microprocessor 45 also includes an instruction register 55 for receiving the operation code field of the instruction to be executed. Microprocessor 45 fetches an instruction by taking the address in the program counter 54 and supplying it by way of an address buffer 56 and address bus 51 to the appropriate memory unit say, for example, the read only memory 46. ROM 46 thereafter outputs onto the data bus 50 the addressed instruction. This instruction is supplied by way of the data buffer 57 to the internal microprocessor bus 58. The operation code field of this instruction is passed by way of a multiplexer 59 and loaded into the instruction register 55. The normal operation of the multiplexer 59 is to connect the microprocessor bus 58 to the input of the instruction register 55.

The microprocessor 45 further includes a control unit 60 responsive to the operation code in instruction register 55 for generating the elemental control signals which control the various elements within the microprocessor and the movement of instructions and data from place to place in the microprocessor. A clock pulse generator 61 supplies timing pulses to the control unit 60 for defining the different time states or timing intervals associated with the execution of each instruction supplied to the instruction register 55. For the case of a microprogrammed control unit, the control unit 60 would include a microword generating mechanism for generating a sequence of microwords for each processor instruction resident in the instruction register 55, a control register for receiving each microword and a decoder responsive to the microword in the control register for producing the elemental control signals supplied to the remainder of the microprocessor.

Other elements included in the microprocessor 45 are an arithmetic and logic unit (ALU) 62 and a pair of registers 63 and 64 for driving the two inputs thereof. ALU 62 performs arithmetic operations like adding and subtracting and logic operations like ANDing and ORing the two numerical values supplied by the registers 63 and 64. A further element contained in the microprocessor 45 is a register array 65 which provides various working registers which are used by the microprocessor. These registers include, for example, an address register, a stack pointer register and a plurality of general purpose registers. Microprocessor 45 also includes a register stack 66 for use in executing Push and Pop instructions and a stack address register 67 for addressing the register stack 66. In some data processors, the register stack 66 instead takes the form of a reserved stack area in the read-write memory 47.

The digital data processing system of FIG. 7 also includes means for supplying a branch and return on address (BAROA) instruction, such instruction having an operation code field, a memory entry address field and a memory exit address field. In the present embodiment, this includes the read-write memory 47, wherein the branch and return on address instructions are stored, the data bus 50, the data buffer 57 and the microprocessor bus 58.

The data processor of FIG. 7 further includes means for loading the operation code field of the branch and return on address instruction into the instruction register 55. This includes the multiplexer 59 which supplies the operation code field to the input of the instruction register 55, a control line 68 from the control unit 60 and the control unit 60 which activates the control line 68 at the appropriate point in time to cause the operation code field to be loaded into the instruction register 55.

The data processor of FIG. 7 further includes an exit address register 70 and means for loading the memory exit address field of the branch and return on address instruction into this exit address register 70. This exit address field is fetched from the read-write memory 47 and appears on the microprocessor bus 58. It is loaded into the exit address register 70 by means of a control pulse appearing on a control line 71 which is connected to the control unit 60. During execution of the BAROA instruction, the control unit 60 energizes this control line 71 at the appropriate point in time to load the exit address into the register 70.

The data processor of FIG. 7 also includes means for loading the memory entry address field of the branch and return on address instruction into the program counter 54. This entry address field is fetched from the read-write memory 47 as part of the BAROA instruction. It appears on the microprocessor bus 58 and is loaded into the program counter 54 by a control pulse appearing on a control line 72 which is one of the output lines of the control unit 60. This load pulse on line 72 is produced by control unit 60 during the execution of the BAROA instruction.

The data processor of Fi.. 7 further includes means for fetching from memory and executing a sequence of instructions starting with the instruction residing at the memory entry address provided by the branch and return on address instruction. In the present embodiment, these sequential instructions are fetched from the read only memory 46. The address of the instruction to be fetched is provided by the program counter 54. Since this fetching of ROM instructions is commenced immediately following the loading of the BAROA entry address field into the program counter 54, the first ROM instruction in the sequence is the instruction located at the entry address provided by the BAROA instruction.

The program counter 54 is incremented each time a ROM instruction is executed. In this manner, the program counter 54 provides the series of ROM addresses needed to fetch the successive ROM instructions from ROM 46. This incrementing is accomplished by way of a control line 73 which is connected to the output of the control unit 60. The control unit 60 produces a control pulse on this line 73 shortly after a new instruction is fetched and loaded into the instruction register 55. This incrementing causes the program counter 54 to be updated to contain the address of the next instruction to be fetched. In this manner, instructions are fetched from the read only memory 46 one after the other in a sequential manner.

The data processor of FIG. 7 also includes means for comparing the memory address in the program counter 54 with the memory address in the exit address register 70 for producing an equality signal when these two memory addresses become equal to one another. This comparing function is provided by a comparator circuit 74 which has one input connected to the program counter 54 and a second input connected to the exit address register 70. The equality signal is produced on an output line 75 of the comparator 74.

The data processor of FIG. 7 also includes means responsive to the occurrence of an equality signal on line 75 for causing a return instruction operation code to be loaded into the instruction register 55 to serve as the next instruction to be executed. This means causes a hardware forced return from tee read only memory 46 to the read-write memory 47 following execution of the last good ROM instruction preceeding the defective ROM code which is to be corrected. This hardware return mechanism includes a hardware circuit 76 for producing a return instruction operation code on a bus 77 which runs to one of the inputs of the multiplexer 59. This return op code hardware 76 is comprised of circuitry for tying up or tying down the individual conductors in the bus 77. Some bus conductors are tied up to a positive voltage level, while other bus conductors are tied down to a circuit ground level. The pattern of tying up and tying down is selected so that there is produced on the bus 77 the operation code pattern for a return instruction. This is a permanent arrangement so that the return op code is always present on the bus 77.

There is also provided a data bus for supplying the instruction operation codes fetched from memory. This is represented by a data bus 78 which is connected to and forms an extention of the microprocessor bus 58.

The hardware return mechanism also includes multiplexer circuit means for selectively coupling either the data bus 78 or the return op code bus 77 to the input of the instruction register 55. This multiplexer circuit means is represented by the multiplexer 59. It connects one or the other but not both of the buses 77 and 78 to the input of the instruction register 55. During the normal operation of the microprocessor, it is the bus 78 that is connected by the multiplexer 59 to the input of the instruction register 55.

The hardware return mechanism further includes means responsive to the occurrence of an equality signal on line 75 for causing the multiplexer circuit 59 to couple the return instruction hardware circuit 76 to the instruction register 55 for enabling the return instruction operation code to be loaded into the instruction register 55 to serve as the next instruction to be executed. This multiplexer control means includes a latch circuit 80 for indicating whether the branch and return on address (BAROA) function is in progress Circuit means are provided for placing the latch 80 in a set condition at the same time that the BAROA exit address is loaded into the exit address register 70. This set condition indicates that the BAROA function is in progress The circuit means for doing the setting includes a control line 81 which is connected at one end to the set (S) terminal of the latch 80 and at the other end to the same output of the control unit 60 as is the control line 71 which loads the exit address register 70. Thus, when the exit address register 70 is loaded, the latch 80 is at the same time set to the set condition.

The multiplexer control means also includes circuit means responsive to the loading of the return instruction operation code from return op code hardware circuit 76 into the instruction register 55 for resetting the latch circuit 80 to indicate that the BAROA function is no longer in progress. This circuit means includes an AND circuit 82, the output of which is connected to the reset (R) terminal of latch 80. One input of AND circuit 82 is connected via control line 83 to the same output of control unit 60 as is the load control line 68 for the instruction register 55. A second input of the AND circuit 82 is connected to the comparator output line 75. Thus, if the equality signal is present on line 75, then the next loading of the instruction register 55 causes the latch 80 to be reset. The reset condition of latch 80 indicates that the BAROA function is not in progress.

The multiplexer control means further includes circuit means coupled to the latch circuit 80 and responsive to the state thereof for enabling the multiplexer 59 to respond to the equality signal on line 75 only when the latch circuit 80 indicates that the BAROA function is in progress. This circuit means is represented by the AND circuit 84. One input of AND circuit 84 is connected to the output of the latch 80 and the other input is connected to the equality signal line 75. The equality signal occurs at the point during the BAROA function when the ROM instruction currently being executed is the last good ROM instruction before the bad code. Since at this point the BAROA function is in progress, the latch 80 is in a set condition. Thus, when the equality signal appears on line 75, the output of AND circuit 84 goes to a high level. This causes multiplexer 59 to switch over and to connect the Return op code bus 77 to the input of the instruction register 55. As a result, the next load pulse appearing on line 68 causes the Return op code on bus 77 to be loaded into the instruction register 55. At the same time, the latch 80 is reset via AND circuit 82 by the same load pulse. This returns the output of AND circuit 84 to a low level. This switches the multiplexer 59 back to its normal condition wherein the microprocessor bus extention 78 is connected to the input of the instruction register 55.

Loading of the Return op code from hardware 76 into the instruction register 55 causes the microprocessor to execute a Return instruction. The Return instruction is a special type of branch instruction which causes the microprocessor to branch to a previously saved memory address. In the present case, this previously saved memory address is the address in the read-write memory 47 of the next instruction following the BAROA instruction.

For this reason, it is necessary to save the desired return address. In particular, the data processor of FIG. 7 includes means responsive to the original loading of the BAROA op code into the instruction register 55 for saving the address of the next following instruction in RWM 47 in a return address register. In the present embodiment, the register stack 66 is used to provide the return address register In particular, when the BAROA instruction is loaded into the instruction register 55, the first steps in its execution are to increment the program counter 54 and then to save this incremented count in the register stack 66. In particular, the micrprocessor saves the address from program counter 54 at the location in the register stack 66 which is specified by the stack pointer register in the register array 65. After this return address is saved, the microprocessor loads the BAROA entry address, in this case, the entry address for ROM 46, into the program counter 54 to commence the sequential execution of the ROM instructions.

When the ROM exit address is reached in program counter 54, the equality signal is produced on line 75 and the Return op code from hardware circuit 76 is loaded into the instruction register 55. Execution of this Return op code causes the address previously saved in register stack 66 to be returned to the program counter 54 for causing the microprocessor to fetch from RWM 47 and execute the instruction following the BAROA instruction in RWM 47.

The operation of the FIG. 7 apparatus relative to the execution of a branch and return on address (BAROA) instruction will now be described. The BAROA instruction 25 of FIG. 3 will be used as the example. The read only memory portion 10 of FIG. 3 is assumed to reside in the read only memory 46 of FIG. 7. The read-write memory portion 12 of FIG. 3 is assumed to reside in the read-write memory 47 of FIG. 7.

The branch instruction 18 of FIG. 3 causes the address of the BAROA instruction 25 to be loaded into the program counter 54. This enables the microprocessor 45 to fetch the BAROA instruction 25 from the read-write memory 47 and to make it available on the microprocessor bus 58. The operation code field of this BAROA instruction 25 is then loaded into the instruction register 55 to commence execution of this BAROA instruction. As an initial part of the execution, the microprocessor 45 increments the program counter 54 and saves the resulting memory address in the register stack 66 This saved address is the return address for the read-write memory 47. As indicated in FIG. 3, this saved return address is the address of the next RWM instruction following the BAROA instruction 25.

The microprocessor 45 thereafter loads the exit address field of the BAROA instruction into the exit address register 70. At this point in time the BAROA activity latch 80 is set to the set condition to signify that a BAROA function is in progress. Thereafter, the microprocessor 45 loads the entry address field of the BAROA instruction into the program counter 54. For the FIG. 3 example, this entry address is the address of the next ROM instruction following the patch hook instruction 14. This completes the execution of the BAROA instruction 25 but does not mark the end of the BAROA function. The BAROA instruction has activated a hardware operation which continues until the subsequent completion of the BAROA function.

Following the loading of the ROM entry address into the program counter 54, the micrprocessor 45 branches to this address in the read only memory 46 and fetches the ROM instruction located at this address. During the execution of this ROM instruction, the program counter 54 is incremented to contain the address of the next ROM instruction. This next ROM instruction is thereafter fetched and the program counter 54 again incremented to provide therein the address of the next subsequent ROM instruction. In this manner, the ROM instructions are fetched and executed one at a time until the ROM exit address contained in the exit address register 70 is reached.

During the fetching and execution of the ROM instructions, the comparator 74 is active to compare the address in program counter 54 with the ROM exit address in exit address register 70. When the address in program counter 54 reaches and becomes equal to the exit address in register 70, the comparator 74 produces an equality signal on its output line 75. This equality signal is supplied by way of AND circuit 84 to tee multiplexer 59 to cause the multiplexer 59 to switch so as to connect the Return op code on bus 77 to the input of the instruction register 55. This causes the hardware generated Return op code to be loaded into the instruction register 55 instead of the op code for the ROM instruction located at the ROM exit address. At this point in time, the BAROA activity latch 80 is reset via control line 83 and AND cirucit 82. The reset condition of latch 80 indicates that the BAROA function is no longer in progress. Among other things, this disables the AND circuit 84 which, in turn, causes the multiplexer 59 to switch back to its normal operating mode wherein the bus 78 is connected to the input of the instruction register 55.

Execution of the hardware generated Return op code which was loaded into the instruction register 55 causes the RWM return address which was saved in the register stack 66 to be returned to the program counter 54. This causes the next instruction which is fetched by the microprocessor 45 to be the RWM instruction immediately following the BAROA instruction 25 in the read-write memory 47. In this manner, the microprocessor 45 commences the sequential fetching and execution of the RWM instructions, the program counter 54 being incremented during the execution of each such instruction. This continues until the RWM branch instruction 22 is reached. This branch instruction 22 loads the program counter 54 with a branch address which, in this case, is the address of the ROM instruction immediately following the ROM bad code segment 15. In this manner, the code patch (corrected code) from the read-write memory 47 is used in place of the bad code segment 15 in the read only memory 46.

The use of the branch and return on address (BAROA) instruction described herein enables patches or fixes to be provided for read only memory code without having to duplicate in the read-write memory any of the good read only memory code. This provides a worthwhile savings of storage space in the read-write memory. The use of the BAROA instruction also removes the burden of critically distributing patch hooks to key areas of the ROM code.

The BAROA instruction described herein provides a method for selectively executing any portion of code as though it were a subroutine. This capability is a great asset when a RWM patch is required to resolve a ROM code bug in a product already shipped to customers. Additionally, the BAROA instruction facilitates development of ROM control programs for microprocessors as it provides code execution break point capability for selectively "steering" a microprocessor through any desired paths of code. "Steering" is accomplished by driving the ROM code under development with a special routine that stacks multiple BAROA instructions that set exit point addresses at decision points in the code. Subsequent BAROA instructions are used to override the decision blocks of the program flow to take any path necessary to test various code sequences.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A method of operating a digital data processing system for enabling instructions in a read-write memory coupled to a data processor to supplement or replace instructions in a read only memory coupled to the data processor, such method comprising:
    loading into the read-write memory a branch and return on address instruction followed by one or more other instructions for supplementing or replacing a portion of the read only memory code, such branch and return on address instruction including an operation code field, a read only memory entry address field and a read only memory exit address field;

commencing execution of the read only memory instructions contained in the read only memory in a sequential manner, such read only memory instructions including a branch instructions or causing a branch to the branch and return on address instruction in the read-write memory;

branching to the read-write memory when such branch instruction is reached and executing the branch and return on address instruction by returning to the read only memory and executing a sequence of read only memory instructions starting with the instruction residing at the entry address provided by the branch and return on address instruction;

and comparing the address of each read only memory instruction with the exit address provided by the branch and return on address instruction for returning to the read-write memory and commencing execution of the read-write memory instructions following the branch and return on address instruction when the read only memory address becomes equal to the exit address, such read-write memory instructions including as a last instruction a branch instruction for branching back to the read only memory after execution of the read-write instructions.

2. A branch and return on address mechanism for use in a digital data processing system for enabling instructions in a read-write memory coupled to a data processor to supplement or replace instructions in a read only memory coupled to the data processor, such mechanism comprising:

means for loading into the read-write memory a branch and return on address instruction followed by one or more other instructions for supplementing or replacing a portion of the read only memory code, such branch and return on address instruction including an operation code field, a read only memory entry address field and a read only memory exit address field;

means for executing the read only memory instructions contained in the read only memory in a sequential manner, such read only memory instructions including a branch instruction for causing a branch to the branch and return on address instruction in the read-write memory;

means responsive to the branch and return on address instruction for returning to the read only memory and executing a sequence of read only memory instructions starting with the instruction residing at the entry address provided by the branch and return on address instruction;

and means for comparing the address of each read only memory instruction with the exit address provided by the branch and return on address instruction for returning to the read-write memory and commencing execution of the read-write memory instructions following the branch and return on address instruction when the read only memory address becomes equal to the exit address, such read-write memory instructions including as a last instruction a branch instruction for branching back to the read only memory after execution of the read-write instructions.

3. In a digital data processor having instruction and data processing elements including a program counter for holding the memory address of the instruction to be executed, an instruction register for receiving the operation code field of the instruction to be executed and a control unit for controlling the instruction and data processing elements in accordance with the operation code field residing in the instruction register, a branch and return on address mechanism comprising:

means for supplying a branch and return on address instruction having an operation code field, a memory entry address field and a memory exit address field;

means for loading the operation code field of the branch and return on address instruction into the instruction register;

exit address register means;

means for loading the memory exit address field of the branch and return on address instruction into the exit address register means;

means for loading the memory entry address field of the branch and return on address instruction into the program counter;

means for fetching from memory and executing a sequence of instructions starting with the instruction residing at the memory entry address provided by the branch and return on address instruction;

means for incrementing the program counter each time an instruction is executed, such program counter providing the memory addresses of the instructions to be fetched;

means for comparing the memory address in the program counter with the memory address in the exit address register for producing an equality signal when these two memory addresses become equal to one another;

and means responsive to the occurrence of an equality signal for causing a return instruction operation code to be loaded into the instruction register to serve as the next instruction to be executed.

4. A branch and return on address mechanism in accordance with claim 3 wherein the means responsive to the occurrence of an equality signal for causing a return instruction operation code to be loaded into the instruction register includes:

hardware circuit means for producing a return instruction operation code;

a data bus for supplying the instruction operation codes fetched from memory;

multiplexer circuit means for selectively coupling either the data bus or the return instruction hardware circuit means to the instruction register;

and means responsive to the occurrence of an equality signal for causing the multiplexer circuit means to couple the return instruction hardware circuit means to the instruction register for enabling the return instruction operation code to be loaded into the instruction register to serve as the next instruction to be executed.

5. A branch and return on address mechanism in accordance with claim 4 and further including:

latch circuit means for indicating whether the branch and return on address function is in progress;

circuit means responsive to the loading of the exit address into the exit address register for setting the latch circuit means to indicate that the branch and return on address function is in progress;

circuit means responsive to the loading of the return instruction operation code into the instruction register for resetting the latch circuit means to indicate that the branch and return on address function is not in progress;

and circuit means coupled to the latch circuit means and responsive to the state thereof for enabling the multiplexer circuit means to respond to the equality signal only when the latch circuit means indicates that the branch and return on address function is in progress.

6. A method of using a read-write memory code patch for correcting a read only memory code bug comprising:

branching from the read only memory code to the read-write memory code patch;

obtaining from the read-write memory code patch a read only memory exit address specifying the first line of read only memory code containing the code bug;

resuming execution of the read only memory code;

comparing the read only memory exit address with the address of the next read only memory instruction to be executed;

and branching to the read-write memory code patch and executing the remainder of the instructions therein when the address of the next read only memory instruction to be executed is equal to the read only memory exit address.

* * * * *